(12) United States Patent
Lawton et al.

(10) Patent No.: US 7,982,715 B2
(45) Date of Patent: Jul. 19, 2011

(54) USER INPUT FOR AN ELECTRONIC DEVICE

(75) Inventors: Simon Lawton, Scunthorpe (GB);
Andrew Bick, Poole (GB); James Eldon, Fleet (GB)

(73) Assignee: Nokia Corporation, Espoo (FI)

( * ) Notice: Subject to any disclaimer, the term of this patent is extended or adjusted under 35 U.S.C. 154(b) by 1204 days.

(21) Appl. No.: 11/644,335

(22) Filed: Dec. 21, 2006

(65) Prior Publication Data

US 2008/0150767 A1 Jun. 26, 2008

(51) Int. Cl.
*G09G 5/00* (2006.01)
(52) U.S. Cl. .......................... 345/168; 341/22
(58) Field of Classification Search .............. 345/22, 345/168; 361/786; 341/22
See application file for complete search history.

(56) References Cited

U.S. PATENT DOCUMENTS

| | | | | |
|---|---|---|---|---|
| 4,032,729 A | * | 6/1977 | Koistinen | 200/5 A |
| 4,315,114 A | * | 2/1982 | Monti, Jr. | 200/5 A |
| 5,565,865 A | * | 10/1996 | So | 341/20 |
| 5,874,697 A | * | 2/1999 | Selker et al. | 200/5 A |
| 6,671,170 B2 | * | 12/2003 | Webb et al. | 361/679.09 |
| 7,006,349 B2 | | 2/2006 | Nuovo et al. | 361/679 |
| 2003/0052164 A1 | | 3/2003 | Higginson | 235/380 |
| 2004/0165364 A1 | * | 8/2004 | Park | 361/786 |
| 2004/0233173 A1 | * | 11/2004 | Bryant | 345/169 |
| 2006/0103623 A1 | | 5/2006 | Davis | 345/156 |
| 2006/0164395 A1 | * | 7/2006 | Eldon et al. | 345/168 |

FOREIGN PATENT DOCUMENTS

| | | |
|---|---|---|
| DE | 28 17 362 A1 | 10/1979 |
| EP | 1450385 A1 | 8/2004 |
| GB | 2 396 845 A | 7/2004 |
| JP | 56-110139 | 9/1981 |

* cited by examiner

*Primary Examiner* — Richard Hjerpe
*Assistant Examiner* — Olga Merkoulova
(74) *Attorney, Agent, or Firm* — Harrington & Smith (57) ABSTRACT

A user input section for an electronic device including a keypad display, a key, and a sheet member. The keypad display is adapted to change display of indicia on the keypad display between at least two different display modes. The key has a user depressible top section located above the display and a bottom section extending below the display. The sheet member includes a main section and a key support section connected to the main section by a living hinge. The main section is substantially stationarily connected to the keypad display. The key is connected to the key support section such that the key is adapted to move relative to the keypad display and the main section with rotation of the living hinge of the sheet member.

34 Claims, 7 Drawing Sheets

USER INPUT FOR AN ELECTRONIC DEVICE

BACKGROUND OF THE INVENTION

1. Field of the Invention

The invention relates to an electronic device and, more particularly, to components of a user input.

2. Brief Description of Prior Developments

Future product concepts for hand-held portable electronic devices are expected to have multiple modes and orientations of use; creating additional user interface complexity. Conventional keymats in hand-held portable electronic devices, such as mobile telephones for example, are typically designed for use in portrait mode only or landscape mode only. This is a problem when the product is also intended for use in the other mode because the keymat is no longer familiar and intuitive to use. For example, some conventional mobile telephones are able to change from a telephone mode having a portrait orientation of the device in the hand(s) of a user to a camera or movie mode having a landscape orientation of the device in the hand(s) of the user. Current keymats do not change to reflect this change in orientation and change in use modality.

Previous solutions include phone soft keys where the key relates to an on-screen menu choice. A touch screen can be used to provide the user with a changing user interface (UI). Other options have included printing all the alternative graphics onto the keys, but this increases visual complexity and confusion. U.K. Patent Application No. GB 2,396,845A discloses ideas for putting tiny displays into keys. However, this has not become a reality due to technology cost limitations.

There is a desire for a new type of user input section for an electronic device which can display indicia in different orientations, be intuitive for users to use, but also to be cost efficient to manufacture.

SUMMARY OF THE INVENTION

In accordance with one aspect of the invention, a user input section for an electronic device is provided including a keypad display, a key, and a sheet member. The keypad display is adapted to change display of indicia on the keypad display between at least two different display modes. The key has a user depressible top section located above the display and a bottom section extending below the display. The sheet member includes a main section and a key support section connected to the main section by a living hinge. The main section is substantially stationarily connected to the keypad display. The key is connected to the key support section such that the key is adapted to move relative to the keypad display and the main section with rotation of the living hinge of the sheet member.

In accordance with another aspect of the invention, a user input section for an electronic device is provided comprising a keypad display, a keypad board, and a plurality of keys. The keypad display is adapted to change display of indicia on the keypad display between at least two different display modes. The keypad display has a plurality of spaced display areas. The keypad board has resiliently depressible key domes. The key domes are located beneath the keypad display and are at least partially offset from respective ones of the display areas. The plurality of keys extends above the keypad display and adapted to actuate the key domes when the keys are depressed by a user.

In accordance with another aspect of the invention, a user input section for an electronic device is provided comprising a keypad display, a keypad board and a plurality of keys. The keypad display is adapted to change display of indicia on the keypad display between at least two different display modes. The keypad display has a plurality of spaced display areas. The keypad board has resiliently depressible key domes. The key domes are located beneath the keypad display. The plurality of keys are adapted to actuate the key domes when the keys are depressed by a user. The keys have top and bottom legs which straddle portions of the keyboard display therebetween.

In accordance with another aspect of the invention, a user input section for an electronic device is provide comprising a keypad display, a keypad board and a plurality of keys. The keypad display has a plurality of spaced discrete display areas. The keypad board has resiliently depressible key domes. The key domes are located beneath the keypad display and offset from the display areas. The plurality of keys have a top section extending above the keypad display and a bottom section adapted to actuate the key domes when the keys are depressed by a user. Each of the spaced discrete display areas has a first side edge extending in a general first direction and a second side edge extending in a general different second direction. Each of the top sections of the keys has a first section extending generally in the first direction and a second section extending generally in the second direction.

In accordance with another aspect of the invention, a user input structural support sheet for user input keys is provided comprising a main section adapted to be assembled into a user input of an electronic device in an assembly with a keypad display; and a plurality of key support sections connected to the main section by respective living hinges. The key support sections are adapted to have the user input keys connected thereto to provide pivotable movement of the keys relative to the main section with rotation of the living hinges.

In accordance with another aspect of the invention, a user input keypad display is provided comprising a plurality of spaced discrete display areas having respective selectively illuminated indicia; and slots in the keypad display forming a plurality of cantilevered fingers. Each of the cantilevered fingers comprises at least a portion of a respective one of the display areas.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
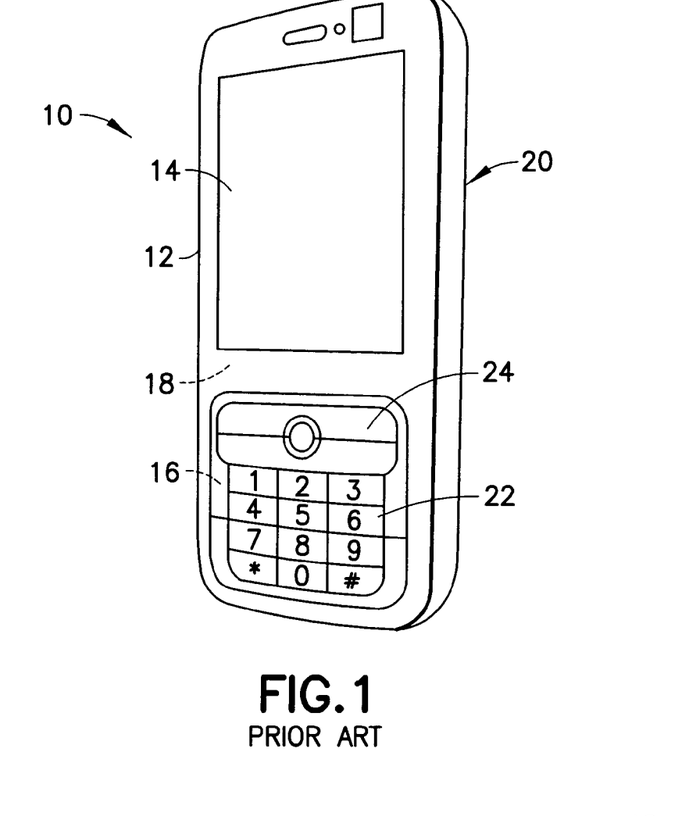
FIG. 1 is a front perspective view of a conventional hand-held portable electronic device which can be modified with the user input of the present invention.

Referring to FIG. 1, there is shown a front view of a conventional hand-held portable electronic device 10. The device 10 shown in FIG. 1 is a mobile telephone which includes at least one other non-telephone application; in this embodiment a digital camera application and digital camera components. In alternate embodiments, features of the invention could be used in any suitable hand-held portable electronic device having multiple applications and/or multiple orientations including, for example, a PDA, a gaming device, a video camera, a pager, a music player, and Internet browser, etc.

The device 10 generally comprises a housing 12, a front side with a display 14 and a user input section 16, electronic circuitry 18 inside the housing and operably coupled to the display 14 and the user input (UI) section 16, and a camera 20 on a rear side. In this embodiment the electronic circuitry includes, for example, a transceiver, an antenna, a microprocessor, a memory and other components convention to a mobile telephone having a camera. FIG. 1 shows the device 10 in a conventional telephone use orientation. More specifically, the device 10 has a general rectangular block shape, orientated generally vertically, with the UI section 16 located below the display 14 on the front face. As is known in the art, the general shape of the device might be other than rectangular, such as with a changeable configuration device. For example, the device could be a flip-type telephone or a slide-type telephone, or other type of changeable housing configuration design including a design having a rotatable housing member.

The UI section 16 generally comprises a keypad section 22 and a control section 24. The keypad section 22 comprises a keypad having conventional keys with alphanumeric indicia for telephone use, such as an ITU-T (International Telecommunication Union-Telecommunication Standardization Sector) keypad for phone dialing. An ITU-T keypad has a keypad layout utilizing twelve keys 12. The ITU-T keypad associates letters of the alphabet with the numbers on the keys 12 of the keypad. By example, the number "2" key carries the letters ABC, the number "3" key carries the letters DEF, etc., as is well known. Other types of letter to number arrangements used in key layouts include those disclosed in U.S. Patent Application Publication No. 2006/0103623 which is hereby incorporated by reference in its entirety. The control section 24 can include, for example, a joystick, soft keys, and/or dedicated operation keys.

Figure 2:
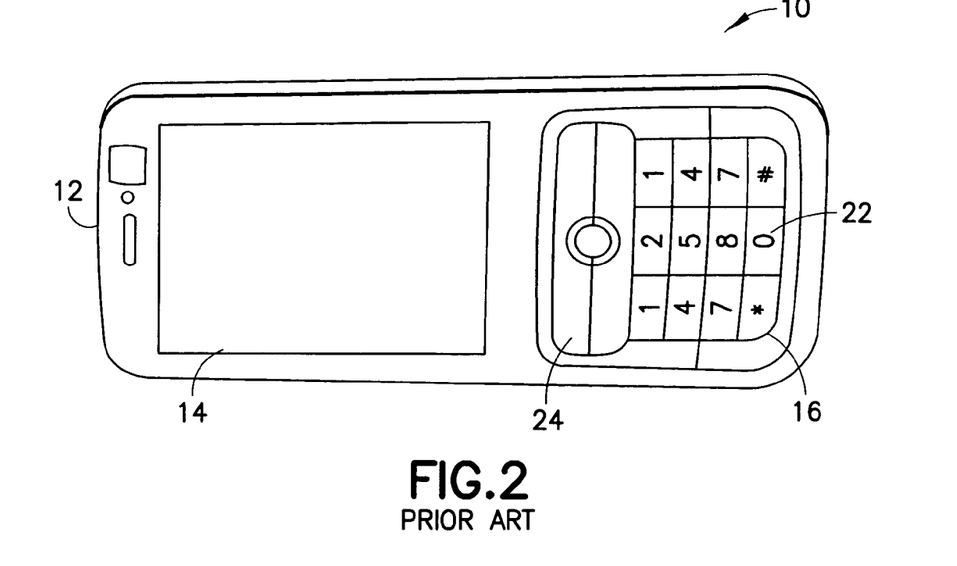
FIG. 2 is a front view of the device shown in FIG. 1 in a landscape orientation.

As noted above, FIG. 1 shows the device 10 in a conventional telephone use orientation. The orientation of the indicia on the keys of the keypad section 22 are orientated for reading in this portrait type of orientation of the device 10. However, as shown in FIG. 2, the device 10 can be re-orientated to a different orientation or use-configuration (in this case a landscape orientation) for viewing of digital camera images on the display 14 while the device is using the camera application. In this device the display 14 has a rectangular shape. Thus, the display 14 is reoriented from its portrait orientation shown in FIG. 1 to its landscape orientation shown in FIG. 2 for better viewing of the picture images on the display. The indicia on the keypad section 22 was only designed for use in the portrait mode shown in FIG. 1. This is a problem when the product is used in landscape mode shown in FIG. 2 because the keypad section, which is also partially used for the camera (non-telephone) application of the device, is no longer familiar and intuitive to use.

Figure 3:
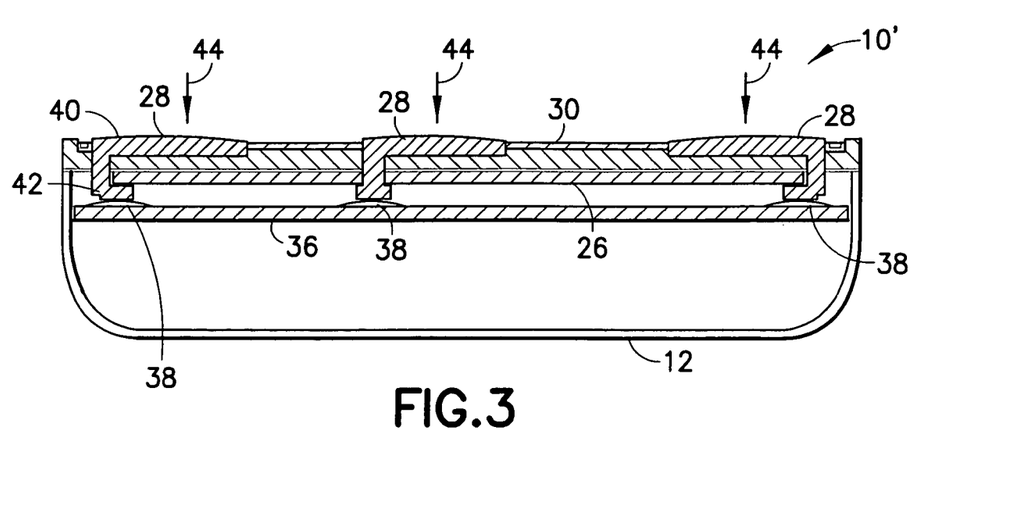
FIG. 3 is a cross sectional view of a user input section comprising features of the invention.
Figure 4:
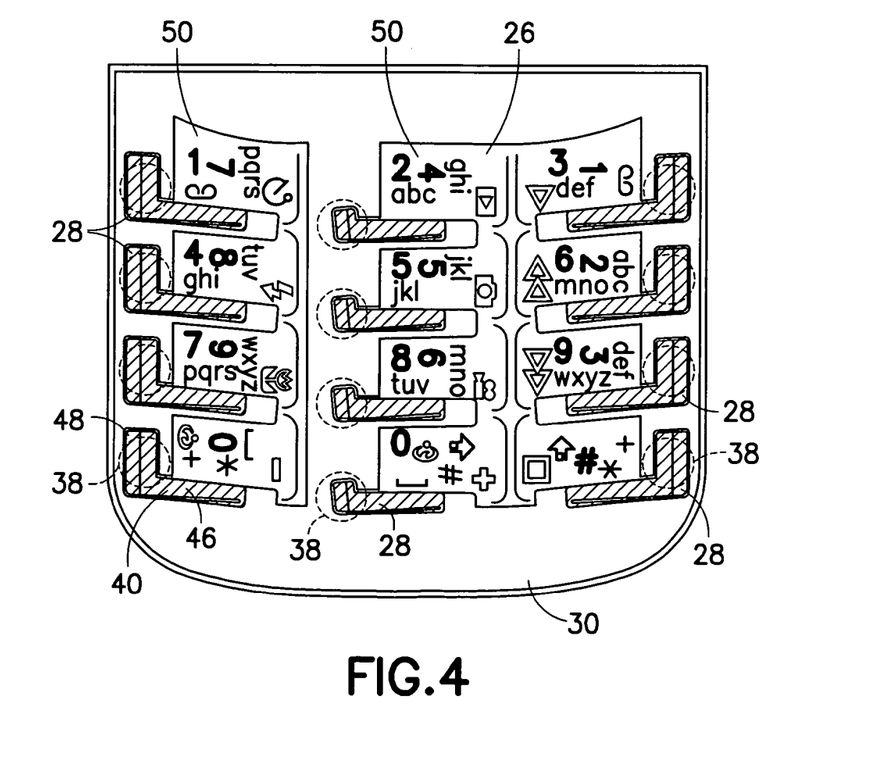
FIG. 4 is a front view of the user input section shown in FIG. 3.

Referring now also to FIGS. 3 and 4, there is shown a different keypad section incorporation features of the invention for use as part of the user input section of the device shown in FIGS. 1 and 2. Although the invention will be described with reference to the exemplary embodiments shown in the drawings, it should be understood that the invention can be embodied in many alternate forms of embodiments. In addition, any suitable size, shape or type of elements or materials could be used.

The keypad section 22' of the user input section of the device 10' generally comprises a keypad display 26, keys or key caps 28, and a sheet member 30. The display preferably comprises a flexible electronic display. 'Flexible' display technologies are relatively young. One of the features of the invention is the proposed use of this young 'flexible' display technology to provide a new and improved user interface. However, in an alternate embodiment any suitable type of display could be used.

One type of flexible display can comprise using a reflective PN LCD or TN LCD display on a plastic substrate. The LCDs can be supplied by Citizen Display Co. LTD. This technology is applicable to all the solutions described herein. In one embodiment, a TN LCD is combined with either a flexible EL lamp or thin silicon lightguide and LEDs to provide illumination. In another embodiment, for the PN LCD, front lighting can be provided in which light from LEDs is carried through a mobile telephone cover and clear keycaps to illuminate the display.

The invention provides a mechanical solution to the problem of achieving changing graphics on a keymat of a portable electronic device. The invention can consist of a keymat with changing graphics to simplify complex functionality and problems caused by switching product orientation. The invention is unique as it can combine a single changing graphics display with a conventional keymat that can use offset key domes to achieve button tactility.

FIG. 4 shows the keypad display 26 with all of the indicia indicated. However, in normal use this would not be the case. Instead, the indicia will be selectively displayed on the keypad display 26 as one of two displayable sets; the first set shown in FIG. 5 and the second set shown in FIG. 6. However, in alternate embodiments more than two sets could be provided. One or more of the sets might comprise only one indicia. However, in this embodiment, each set has twelve subsets of multiple indicia in each subset; one subset for each one of the keys 28. In this embodiment the keypad display 26 has a plurality of spaced discrete display areas 50. In the portrait orientation of the device, the display areas 50 are arranged in three columns and four rows. However, any suitable arrangement or pattern of the display areas could be provided. In this embodiment, each display area 50 has at least one indicia of both of the sets of indicia. However, in an alternate embodiment one or more of the display areas might only have one indicium or indicia of only one of the sets.

Figure 5:
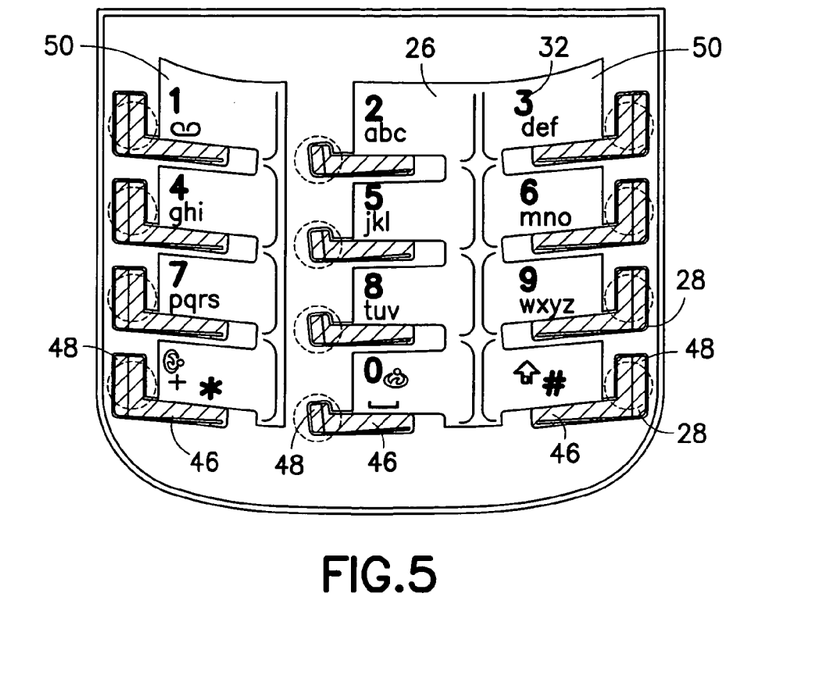
FIG. 5 is a front view of the user input section shown in FIG. 4 in a first mode.

FIG. 5 shows the keypad display 26 with the first set of indicia 32 displayed for a first mode of operation of the device 10'. This first mode of operation corresponds to the telephone mode illustrated in FIG. 1 wherein the device is generally intended to be used in its portrait orientation. Because the device 10' in this embodiment is intended to be used as a telephone in the portrait orientation, the first set of indicia generally correspond to ITU-T keypad indicia for phone dialing and data entry; orientated for reading when the device is in the portrait orientation shown in FIG. 1.

Figure 6:
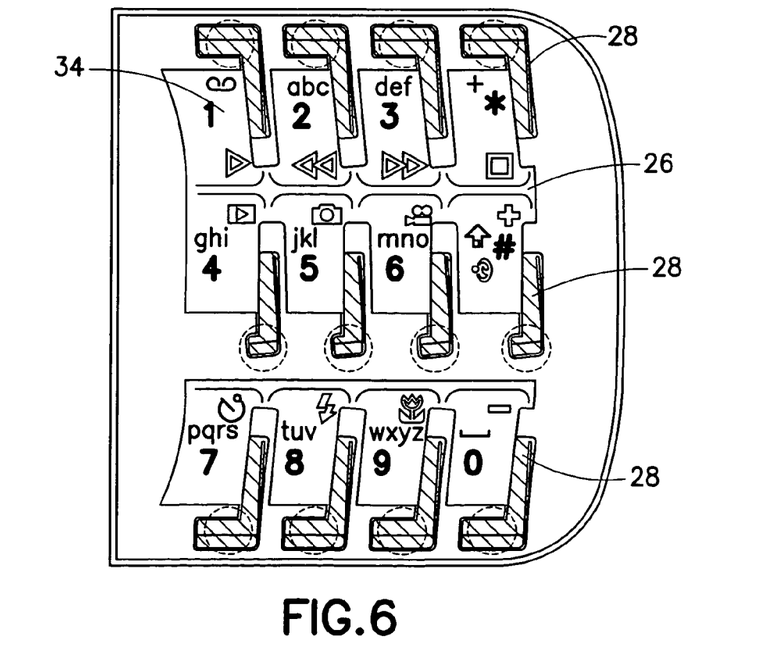
FIG. 6 is a front view of the user input section shown in FIG. 4 in a second mode.

FIG. 6 shows the keypad display 26 with the second set of indicia 34 displayed for a second mode of operation of the device 10'; or at least a second different orientation of the device. This second mode of operation or orientation corresponds to the use of the device as illustrated in FIG. 2 wherein the device is generally intended to be used in its landscape orientation. Because the device 10' in this embodiment is intended to be used as an image viewer in the landscape orientation, the second set of indicia includes digital camera application indicia. In this embodiment the second set of indicia also includes ITU-T keypad indication for phone dialing and data entry; orientated for reading when the device is in the landscape orientation shown in FIG. 2. FIG. 6 shows the keypad section rotated 90 degrees relative to FIG. 5 to clearly illustrate the reorientation of the device and ability to read the different sets of indicia in the different orientations. The electronic circuitry of the device 10' is adapted to change the set of indicia displayed on the keypad display 26 based up a user selection of an application, and/or movement of housing sections relative to each other, and/or default setting, etc.

As seen in FIG. 3, the user input section includes a keypad board 36 which is part of the electronic circuitry. The keypad board 36 is a printed wiring board having key domes 38. The key domes 38 are resiliently depressible force sensing domes which are adapted to signal depression of one of the keys 28 by a user. More specifically, each key 28 has a top section 40 and a bottom section 42. The top section 40 is located above the keypad display 26 and is adapted to be contacted by a user's finger and depressed inward as shown by arrows 44. The bottom section 42 of each key 28 is located on the top surface of a respective one of each key dome 38. Thus, depression of the key 28 inward results in its respective key dome 38 being actuated. In an alternate embodiment any suitable type of signal switch arrangement could be provided.

In this embodiment the top section 40 of each key 28 has a general L shape. The general L shape is formed by a first leg 46 and a second leg 48. When the device 10' is in its portrait orientation, as seen in FIG. 5, the first leg 46 of each key 28 is substantially horizontal and the second leg 48 is substantially vertical. The second legs 48 of the first and second rows of keys are located to the left of the first and second rows of display areas 50. The second legs 48 of the third rows of keys are located to the right of the display areas 50. Each of the spaced discrete display areas has a first side edge extending in a general first direction and a second side edge extending in a general different second direction, wherein each of the top sections of the keys has a first section extending generally in the first direction and a second section extending generally in the second direction. However, in alternate embodiments any suitable shape of the top sections of the keys could be provided. In addition, any suitable orientations of those key top sections relative to the display areas 50 could be provided.

When the device 10' is in its landscape orientation, as seen in FIG. 6, the first leg 46 of each key 28 is substantially vertical and the second leg 48 is substantially horizontal. The first legs 46 are all located to the right of the display areas 50.

Figure 7:
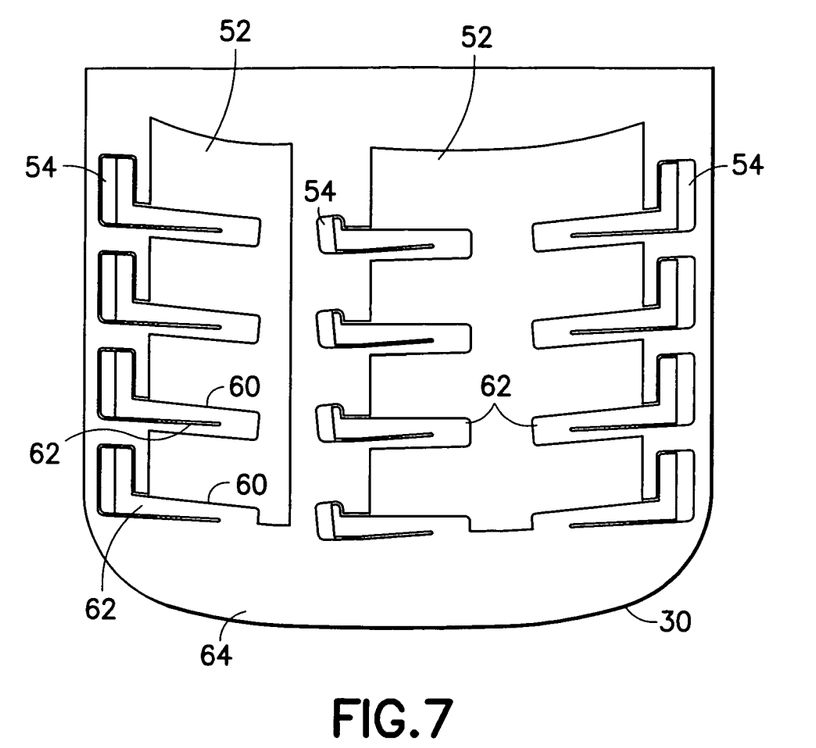
FIG. 7 is a front view of the sheet member used in the assembly shown in FIG. 3.

As seen in FIG. 3, portions of the keypad display 26 are located between portions of the top and bottom sections 40, 42 of each key 28. This helps to retain the keys with the keypad display. Referring also to FIG. 7, the sheet member 30 provides a movable support for the keys 28. The sheet member 30 generally comprises a single metal member. However, in alternate embodiments, the sheet member 30 could be comprised of multiple members, and may comprise different material(s) such as a shape memory alloy or superelastic material, such as NITINOL for example.

Figure 8:
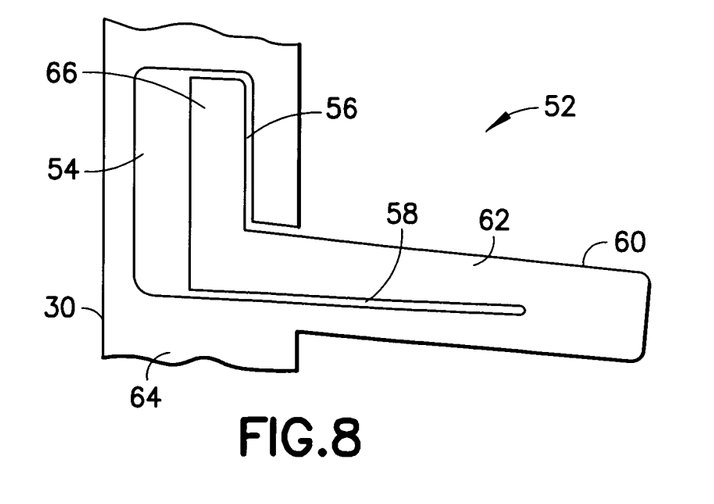
FIG. 8 is a partial, enlarged view of the sheet member shown in FIG. 7.

The sheet member 30 is located above the keypad display 26. The sheet member 30 comprises apertures 52 which form windows to allow a user to see the display areas 50 of the keypad display 26. The sheet member 30 also comprises apertures 54 for each one of the keys 28. Portions of the keys 28 are able to extend through the apertures 54 between the top section 40 and the bottom section 42 of the keys. As seen best in the partial, enlarged view of FIG. 8, proximate each aperture 54 the sheet member 30 also has two slits 56, 58. The first slit 56 extends between the two apertures 52, 54. The second slit 58 extends from the aperture 54 along an extension 60. This forms cantilevered arms 62 extending from a main portion 64 of the sheet member 30 to ends 66 of the arms at each of the apertures 54. The arms 62 have a general C shape except at the bottom row of arms.

The top sections 40 of the keys 28 are located on top of the sheet member 30 on the arms 62. The arms 62 are able to resiliently deflect inward, in a general cantilever fashion, when a user depresses the keys 28 inward. The sheet member 30 forms a user input structural support sheet for the user input keys 28. The main section 30 is adapted to be assembled into a user input of an electronic device in an assembly with the keypad display 26. The arms 62 form a plurality of key support sections. The arms 62 also form respective living hinges with the main section 64. This provides pivotable movement of the keys relative to the main section with rotation of the living hinges (deflection of the arms 62).

In this embodiment the key domes 38 are located under the second legs 48 of the keys 28. This is offset from beneath the display areas 50. When the user presses against one of the second legs 48 to actuate a key, its respective key dome 38 is actuated. Because of the attachment of the keys 28 to the main portion 64 of the sheet member 30 by the living hinges, when the user presses against one of the first legs 46 to actuate a key, its respective key dome 38 is also actuated; even though it is at least partially offset from beneath the first leg 46.

The sheet member 30 is connected to the keypad display; at least indirectly if not directly. The keypad display 26 is preferably at least partially a reflective display. As noted above, the sheet member 30 is located above the keypad display 26. The sheet member comprises a bottom surface forming a light reflection surface for reflecting light onto the keypad display. Thus, in addition to forming a support for the keys 28, the sheet member also forms a light reflector for the reflective keypad display. However, in an alternate embodiment, the sheet member might not form a keypad display reflector.

Figure 9:
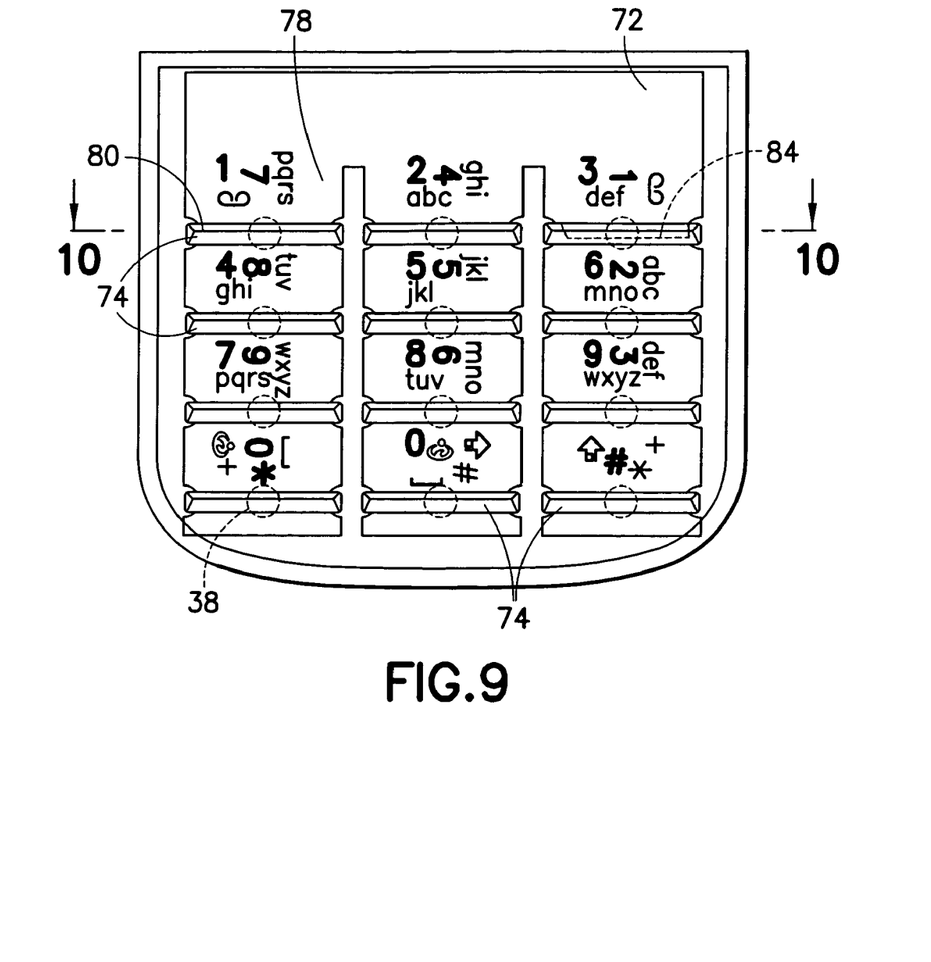
FIG. 9 is a front view of an alternate embodiment of the user input section shown in FIG. 4.
Figure 10:
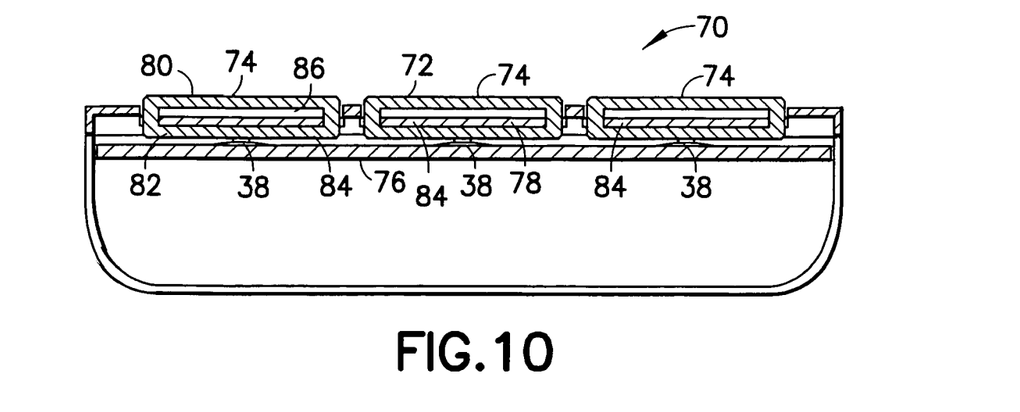
FIG. 10 is a cross sectional view of the user input section shown in FIG. 9 taken along line 10-10.

Referring also to FIGS. 9-10, an alternate embodiment of the device is shown. In this embodiment the device 70 has a user input section with a keypad assembly 72 comprising a keypad display 78, keys or key caps 74, and a keypad board 76. The keypad display 78 preferably comprises a flexible electronic display. The keypad board 76 is a printed circuit board with key domes 38. The key domes 38 are resiliently depressible force sensing domes which are adapted to signal depression of one of the keys 74 by a user. As seen best in FIG. 10, the keys 74 have a general ring or loop shape with a top section 80 and a bottom section 82. The keypad display 78 has a plurality of spaced discrete display areas 50 having respective selectively illuminated indicia. The keypad display 78 also has slots in the keypad display forming a plurality of cantilevered fingers 84. Each of the cantilevered fingers 84 comprises at least a portion of a respective one of the display areas 50.

The slots in the keypad display 78 allow the keys 74 to be mounted on the fingers 84 of the keypad display 78. More specifically, the fingers 84 are received in the center apertures 86 of the general ring shaped keys 74. When a user depresses one of the keys 74, the bottom sections 82 depresses its respective the key dome 38, and the finger 84 can move freely relative with the key 74 in the center aperture 86.

Figure 11:
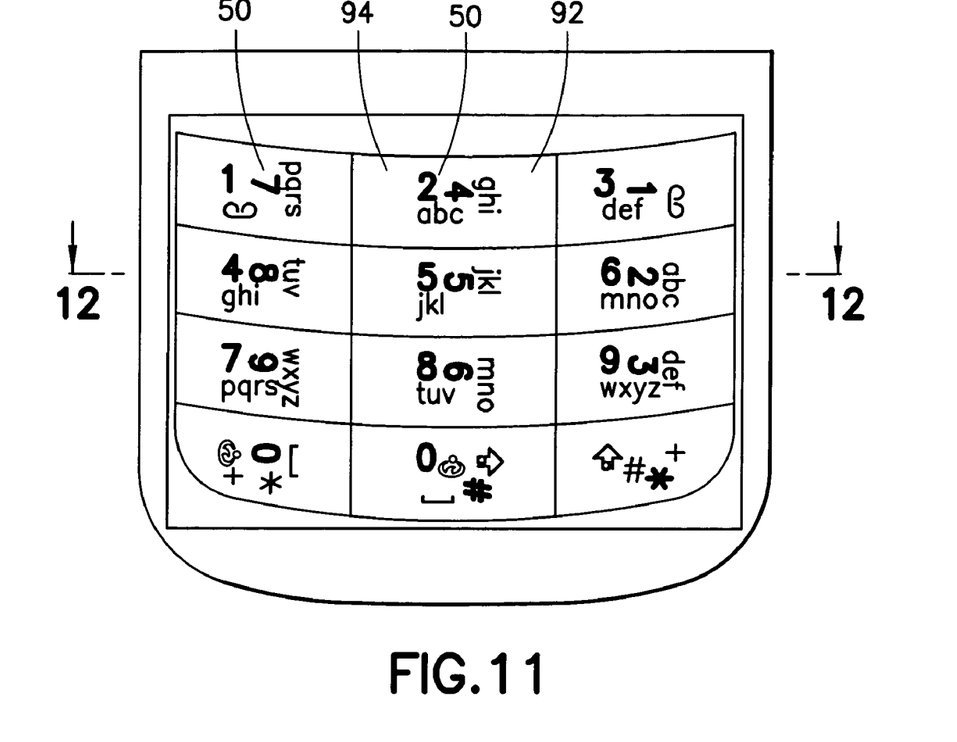
FIG. 11 is a front view of another alternate embodiment of the user input section shown in FIG. 4.
Figure 12:
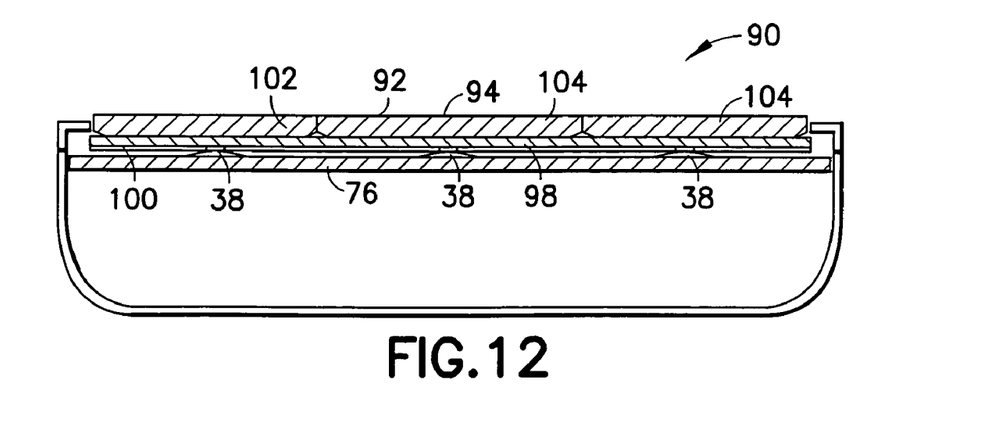
FIG. 12 is a cross sectional view of the user input section shown in FIG. 11 taken along line 12-12.

Referring also to FIGS. 11-12, another alternate embodiment of the device is shown. In this embodiment the device 90 has a user input section with a keypad assembly 92 comprising a keypad display 98, a keymat 94, and a keypad board 76. The keypad display 98 preferably comprises a flexible electronic display. The keypad board 76 is a printed circuit board with key domes 38. The key domes 38 are resiliently depressible force sensing domes which are adapted to signal depression of one of the key sections of the keymat 94 by a user. The key domes 38 are located directly under the key sections and the display areas 50 of the keypad display 98.

In the embodiment shown in FIG. 12, a plunger sheet 100 is provided between the bottom of the keypad display 98 and the key domes 38. In a preferred embodiment the plunger sheet 100 is a silicon plunger sheet. In alternate embodiments more than one sheet could be provided, and the sheet could be comprised of any suitable material(s). Alternatively, the plunger sheet might not be provided. The sheet 100 forms a stopper sheet which prolongs the life of the keypad display by spreading the force when pressing the dome through the flexible display 98, and it prevents mis-selection of surrounding keys when pressing hard. For example pressing the number "5" key hard could otherwise also press the domes 38 of number "8" key and number "2" key. The stopper sheet 100 prevents damage to the keypad display.

Figure 13:
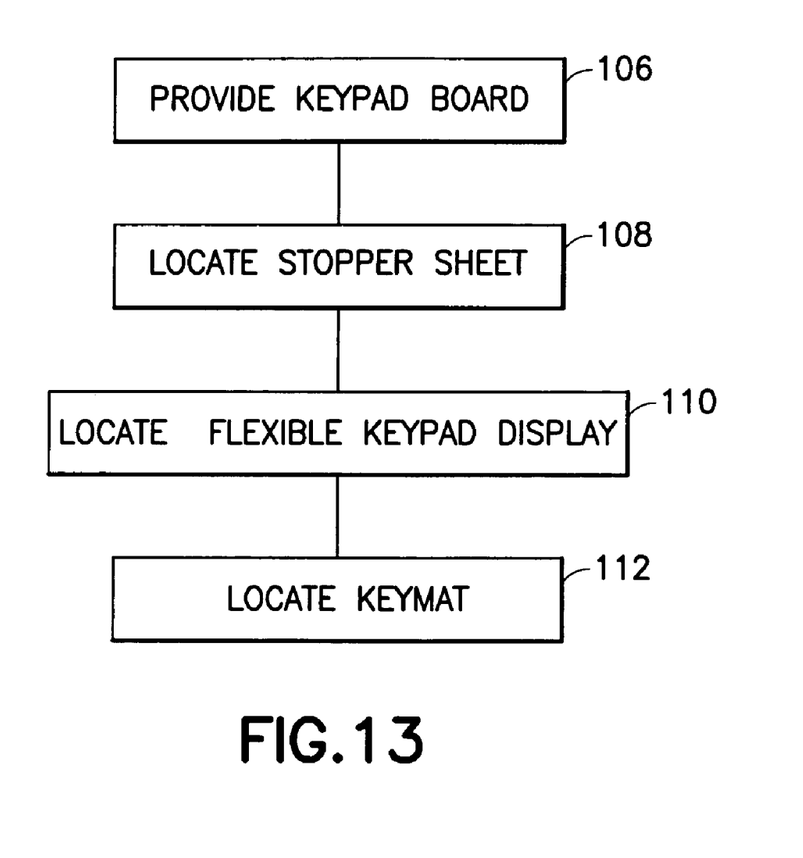
FIG. 13 is diagram illustrating a method of assembling a user input keypad and display assembly.

In the embodiment shown in FIG. 12 the keymat 94 has keycaps 104 which are held on a clear carrier sheet 102 that overlays the display 98. However, the carrier sheet 102 might not be provided, or could be provided on top of the keycaps 104. Alternatively, the keycaps 104 could be bonded to the display 98. In the embodiment shown, and referring to FIG. 13, a method of assembling a user input keypad and display assembly can comprise providing a keypad board having resiliently deflectable key domes as indicated by block 106; locating a silicon plunger sheet on the key domes as indicated by block 108; locating a flexible keypad display on the silicon plunger sheet as indicated by block 110; and locating a keymat on the flexible keypad display as indicated by block 112, wherein the keymat comprises keycaps and a carrier sheet connecting the keycaps to each other. The steps could be in any suitable order or perhaps together. Similar steps could be used to assemble the other embodiments described herein.

The examples described above illustrate three ways of implementing the concept of a changing graphical keymat. The first embodiment described above includes the structural use of a thin flexible metal sheet member as a living key hinge and light reflector. This embodiment also provides a method for front lighting the reflective display and illustrated the concept of offsetting key domes with a hinged key cap design. In the first embodiment, the invention can use a thin film (electrophoretic) flexible display sandwiched between the keymat and the printed circuit board (PCB). The display is visible through or around the keys and provides all the graphical information. The key caps or keys actuate the key domes by bridging the display and connecting to offset domes. The concept of using offset key domes within the context of a changing graphical keymat allows a much larger display area and a greater amount of information to be visible to the user. The use of offset domes also isolates any forces, generated by pressing the keys, away from the display helping reliability and display life.

As shown in the second embodiment (FIGS. 9-10), the keys can also actuate the key domes using key caps that 'straddle' the display which passes through the center. An alternative solution as shown in the third embodiment (FIGS. 11-12) is to press directly through the display to actuate the key domes. This solution is the most simple, but does not isolate the input forces. The concept of a changing graphical keymat is very desirable and the advantages of this invention both to the manufacturer and the end users are clear.

Future hand-held portable electronic devices are expected to have multiple modes and orientations of use; creating additional user interface complexity. Conventional keymats are typically designed for use in portrait mode only. This is a problem when the product is also intended for use in landscape as the keymat is no longer familiar and intuitive to use. Products change to camera or movie modes, current keymats do not change to reflect this.

The invention can consist of a keymat with changing graphics to simplify complex functionality and problems caused by switching product orientation. The invention can combine a single changing graphics display with a conventional keymat that can use offset key domes to achieve button tactility. The first two embodiments solve issues with current thin displays, including designs to prevent damage to the displays from pressing through them. The first embodiment shows a solution using a novel hinge mechanism which allows a key cap to straddle the U shaped display. The second embodiment shows a solution to isolate all the pressing forces away from the finger display. The invention also covers the display of icons in both landscape and portrait orientation, and the display of hidden keymat functions (camera, music, movies etc). The different sets of indicia could be shown based merely upon the mode of the device. The different sets of indicia do not need to have different orientations. They could have the same orientation. For example, showing a first set of telephone key indicia when the device is in a telephone mode, showing a second set of digital camera key indicia when the device is in a digital camera mode, and showing gaming key indicia when the device is in a gaming mode. The first and second sets could be in a first orientation while the third set is in a second orientation; or all three could be in the same orientation. This are merely examples and should not be considered as limiting.

The solution in the second embodiment differs because there is only one display which is split into fingers that pass through hollow key caps.

U.K. Patent Application No. GB 2,396,845A have individual displays inside each key. It has been demonstrated that the solution in FIGS. 3-8 is possible using flexible displays on plastic substrates. This is because complex profiles and cut through can be achieved and the display flexes when the key cap is pressed. The sheet member in the first embodiment provides a mechanical solution for a functional individual key graphical changing keymat.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. An apparatus comprising:
  a keypad display adapted to change display of indicia on the keypad display between at least two different display modes;

a key having a user depressible top section located above the keypad display and a bottom section extending below the keypad display; and a sheet member comprising a main section and a key support section connected to the main section by a living hinge, wherein the main section is substantially stationarily connected to the keypad display, and wherein the key is connected to the key support section such that the key is adapted to move relative to the keypad display and the main section with rotation of the living hinge of the sheet member.

2. An apparatus as in claim 1 wherein the keypad display comprises first indicia adapted to be displayed in a first one of the display modes and second indicia adapted to be displayed in a second one of the display modes.

3. An apparatus as in claim 2 wherein the first and second indicia are orientated at different reading orientations about 90 degrees relative to each other.

4. An apparatus as in claim 1 wherein portions of the key display and the sheet member are sandwiched between portions of the top and bottom sections of the key.

5. An apparatus as in claim 1 wherein the top section of the key has a general L shape.

6. An apparatus as in claim 5 wherein the key forms a first key, and the apparatus further comprises a second key connected to a second key support section of the sheet member, wherein the second key has a general L shape which is orientated generally reverse relative to the L shape top section of the first key.

7. An apparatus as in claim 1 wherein the keypad display has a plurality of spaced discrete display areas, wherein each of the spaced display areas has a first side edge, extending in a general first direction and a second side edge extending in a general different second direction, and wherein the top section of the key has a first section extending generally in the first direction and a second section extending generally in the second direction.

8. An apparatus as in claim 1 wherein the sheet member is metal.

9. An apparatus as in claim 1 wherein the keypad display has a plurality of spaced discrete display areas, and the user input further comprises a keypad board having a resiliently depressible key dome, wherein the key dome is located beneath the keypad display and offset from the display areas, wherein the bottom section of the key is adapted to depress the key dome.

10. An apparatus as in claim 1 wherein the key support section has a general L shape.

11. An apparatus as in claim 1 wherein the keypad display is at least partially a reflective display, wherein the sheet member is located above the keypad display, and wherein the sheet member comprises a bottom surface forming a light reflection surface for reflecting light onto the display.

12. An apparatus as in claim 1 wherein the sheet member comprises apertures which form windows for viewing the indicia on the keypad display.

13. A hand-held portable electronic device comprising:
a housing,
a display screen connected to the housing;
electronic circuitry located in the housing and coupled to the display screen; and
an apparatus as in claim 1 forming a user input section connected to the housing and coupled to the electronic circuitry.

14. A hand-held portable electronic device as in claim 13 wherein the device comprises a mobile telephone, wherein the electronic circuitry comprises a transceiver, and wherein the device comprises at least one non-telephone electronic application.

15. A hand-held portable electronic device as in claim 13 wherein the device is adapted to display information on the display screen in a first orientation when the keypad display displays the indicia on the keypad display in a first one of the display modes, and wherein the device is adapted to display information on the display screen in a second different orientation when the keypad display displays the indicia on the keypad display in a second one of the display modes.

16. A user input section for an electronic device comprising:
a keypad display adapted to change display of indicia on the keypad display between at least two different display modes, wherein the keypad display has a plurality of spaced discrete display areas;
a keypad board stacked beneath the keypad display and having resiliently depressible key domes, wherein the key domes are located beneath the keypad display and each key dome is at least partially laterally offset from a respective one of the display areas; and
a plurality of keys extending above the keypad display and adapted to actuate the key domes when the keys are depressed by a user.

17. A user input section as in claim 16 wherein the keypad display comprises first indicia adapted to be displayed in a first one of the display modes and second indicia adapted to be displayed in a second one of the display modes.

18. A user input section as in claim 17 wherein the first and second indicia are orientated at different reading orientations about 90 degrees relative to each other.

19. A user input section as in claim 16 wherein at least one of the key domes is entirely offset from its respective display area.

20. A user input section as in claim 16 wherein the keys have a top section with a general L shape.

21. A user input section as in claim 16 wherein a first one of the key domes is offset from a first one of the display areas in a first direction and a second one of the key domes is offset from a second one of the display areas in a second different direction.

22. A user input section as in claim 16 wherein the keys have a general loop shape.

23. A user input section as in claim 16 further comprising a sheet member comprising a main section and key support sections connected to the main section by living hinges, wherein the keys are connected to the key support sections such that the keys is adapted to move relative to the keypad display and the main section with rotation of the living hinges of the sheet member.

24. A user input section as in claim 16 wherein the keys have top and bottom legs which straddle portions of the keyboard display therebetween.

25. A user input section as in claim 16 wherein the keypad display comprises slots forming a plurality of cantilevered fingers, wherein each of the cantilevered fingers comprises at least a portion of a respective one of the display areas.

26. A user input section for an electronic device comprising:
a keypad display adapted to change display of indicia on the keypad display between at least two different display modes, wherein the keypad display has a plurality of spaced discrete display areas;
a keypad board having resiliently depressible key domes, wherein the key domes are located beneath the keypad display; and a plurality of keys adapted to actuate the key domes when the keys are depressed by a user, wherein the keys have top and bottom legs which straddle portions of the keyboard display therebetween, wherein the keypad display comprises slots forming a plurality of cantilevered fingers, wherein each of the cantilevered fingers comprises at least a portion of a respective one of the display areas.

27. A user input section as in claim 26 wherein the keys have a general ring shape.

28. A user input section as in claim 26 wherein the keys are mounted on the cantilevered fingers.

29. A user input section as in claim 28 wherein the keypad display is a thin film flexible display.

30. A user input section as in claim 26 wherein the domes are located off-center from respective centers of the display areas.

31. An apparatus comprising:
   a keypad display having, a plurality of spaced discrete display areas;
   a keypad board having resiliently depressible key domes, wherein the key domes are located beneath the keypad display and offset from the display areas; and
   a plurality of keys having a top section extending above the keypad display and a bottom section adapted to actuate the key domes when the keys are depressed by a user,
   wherein each of the spaced discrete display areas has a top side with a first side edge extending in a general first direction and a second side edge extending in a general different second direction, wherein each of the top sections of the keys has a first section extending generally in the first direction generally along the first side edge and a second section extending generally in the second direction generally along the second side edge.

32. A user input structural support sheet for user input keys comprising:
   a main section adapted to be assembled into a user input of an electronic device in an assembly with a keypad display; and
   a plurality of key support sections connected to the main section by respective living hinges, wherein the key support sections are adapted to have the user input keys connected thereto to provide pivotable movement of the keys relative to the main section with rotation of the living hinges, wherein at least one of the living hinges has a general C shape in a single plane.

33. A user input keypad display comprising:
   a plurality of spaced discrete display areas having respective selectively illuminated indicia; and
   slots in the keypad display forming a plurality of cantilevered fingers, wherein each of the cantilevered fingers comprises at least a portion of a respective one of the display areas.

34. A method of assembling a user input keypad and display assembly comprising:
   providing a keypad board having resiliently deflectable key domes;
   locating a silicon plunger sheet on the key domes;
   locating a flexible keypad display on the silicon plunger sheet; and
   locating a keymat on the flexible keypad display, wherein the keymat comprises keycaps and a carrier sheet connecting the keycaps to each other.

* * * * *